Patented July 6, 1926.

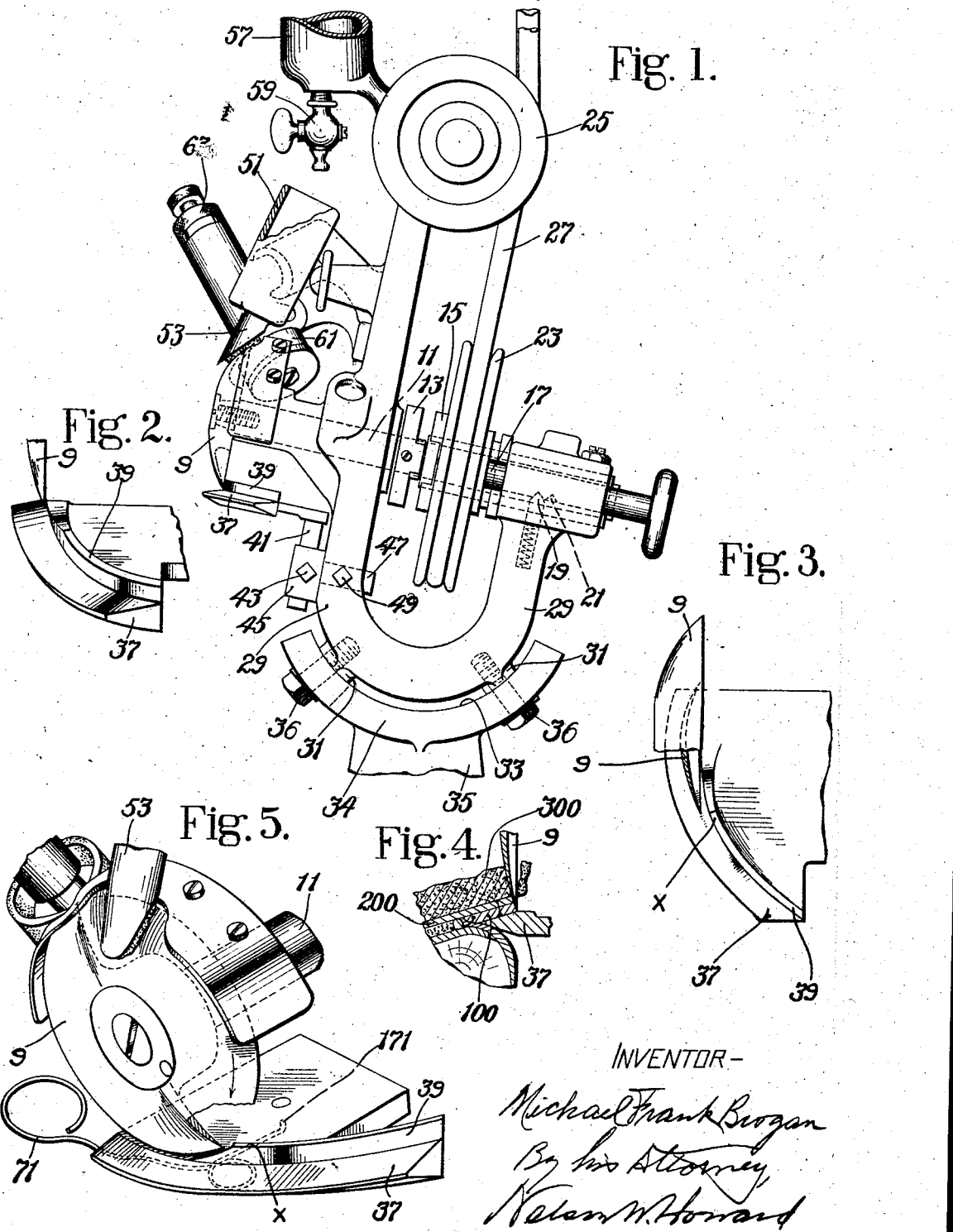

1,591,012

UNITED STATES PATENT OFFICE.

MICHAEL FRANK BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

TRIMMING MACHINE.

Application filed April 6, 1923. Serial No. 630,369.

This invention relates to trimming machines and is herein illustrated as embodied in a machine for trimming the edges of crepe rubber soles of boots and shoes.

For convenience, the invention will be described in connection with the trimming of such soles in the manufacture of Goodyear welt shoes. Owing to the soft and spongy nature of crepe rubber, it is not feasible to trim soles made of this material on the rough rounding machine which is commonly used in the manufacture of leather soles. For this reason, among others, it has been customary to employ in the manufacture of shoes having crepe rubber soles a procedure some different from that employed in the manufacture of leather soled shoes. A common practice is to stitch to the welt a thin middle sole or slip-sole, which may be of leather, but is usually of rubber, then to trim on a rough rounding machine the edges of the welt and slip-sole to a common edge having the desired contour, then to cement or otherwise attach the crepe rubber sole to the bottom of the shoe, and thereafter to trim the crepe sole to the contour of the common edge or registering edges of the rought-rounded slip-sole and welt. Although a slip-sole has been mentioned above, such sole may be omitted and the crepe sole attached directly to the bottom of the lasted and welted shoe. In any event, a condition results in which the crepe rubber sole has to be trimmed to the contour of some member of the marginal extension of the shoe such for example as the welt. Hitherto this sole trimming operation has been accomplished manually; and the general object of the present invention is to provide a machine by which this and similar operations may be performed.

According to one feature of the invention there is provided a concavo-convex or dished cutter and a work support, the construction and arrangement being such that the convex face of the cutter is toward the shoe. With such a construction the sole may be trimmed flush with the previously shaped welt or other guiding element at all points, since the convexity of the cutter permits the latter to follow the incurve of the edge at the shank portion of the sole.

Inasmuch as the desired contour has been imparted to the layer or layers that form the marginal extension of the shoe bottom before the outsole is laid, it is desirable to use the perimeter of said extension to control the course of trimming of the outsole. Accordingly, another feature of the invention consists in a novel combination including a work-support and an edge-gage so related that the work-support will engage and sustain the previously shaped marginal extension while the edge-gage engages the perimeter thereof but not the perimeter of the outsole. To insure this effect the edge-gage is restricted to a depth or thickness no greater than, if as great as, that of the previously shaped extension, thus permitting the untrimmed margin of the outsole to overlap and project beyond the edge-gage while the controlling portion of the marginal extension is sustained as aforesaid. Provision is made for adjusting the edge-gage to a position that will insure trimming the outsole flush with the perimeter of the previously shaped marginal extension.

These and other features of the invention including certain details of construction and combinations of parts will be described as embodied in an illustrative machine and pointed out in the appended claims.

Referring now to the accompanying drawings:—

Figure 1 is a front elevation of a machine in which the invention is embodied.

Fig. 2 is a perspective showing the relation of the cutter to the work-rest.

Fig. 3 is a plan of the cutter and work-rest.

Fig. 4 is a sectional view of the cutter, work-rest and shoe, and

Fig. 5 is a perspective showing more particularly the positions of the cutter moistener and cutter-grinder with relation to the cutter.

The machine comprises a concave-convex or dished cutter 9 fast to the outer end of a shaft 11, said shaft having fast upon its inner end a clutch member 13 adapted to be engaged, when desired, with a clutch member 15 fast to a short shaft 17 which is shown as held in its right-hand position by a spring-pressed catch 19 having a pointed nose to engage a notch in said shaft. When it is desired to throw in the clutch, the shaft 17 is pushed to the left until the plunger 19 engages the right-hand notch 21. The shaft 17 carries a pulley 23 around which and over two guide pulleys, one of which is shown at 25, runs a belt 27, the upper run of said belt passing around a power pulley, not shown. By reason of this mounting of the belt, the head 29 of the machine may be tilted without disturbing the driving connection. The head 29, in bearings in which the shafts 11 and 17 are mounted, has a U-shaped base provided with lugs 31 adapted to rest upon a concavely curved surface 33 formed on a curved extension 34 at the top of the pedestal 35. Cap screws 36 passing through slots in the extension 34 and threaded into the lugs 31 hold the head in adjusted angular position.

Located in cooperative relation to the cutter 9 is a work-rest comprising a supporting member 37 arranged to sustain the welt or equivalent marginal extension as shown in Fig. 4, and a gage 39 rising above the support high enough to engage the edge of the welt. This work-rest has a stem 41 adjustably held by a set-screw 43 in a socket in a member 45, the stem 47 of which is held by a set-screw 49 in a socket in the head 29 which is at right angles to the socket in the member 45. With this construction the work-rest may be adjusted in directions parallel to the stems 41, 47 and angularly about the axes of the stems.

Located above the cutter is a trough 51 having leading from its lower end a pipe 53 in the outlet of which is a piece of felt 55 held in contact with the cutter. Above the trough is a reservoir 57 for oil having in its lower end an outlet cock 59. The purpose of the construction just described is to lubricate the cutter so as to improve its cutting action on the rubber. Mounted in the rear of the cutter is a grinder 61 which may be moved into and out of contact with the cutter by turning a finger-hold 63.

Although the machine is capable of operating upon different types of shoes, there has been shown a shoe comprising a welt 100 to which is stitched a slip-sole 200. After the slip-sole has been stitched in place, the edges of the welt and slip-sole are trimmed, in any suitable manner as for example by the use of a rough-rounding machine, to the desired contour so that the edges of the welt and slip-sole register with each other and form in effect a common edge. The thick, crepe rubber outsole 300 is now attached, for example by cement, and the shoe at this stage is presented to the machine to trim the crepe rubber outsole to the contour of the welt and slip-sole. The shoe is preferably presented to the machine bottom side up, as shown in Fig. 4, with the welt resting upon the support 37. It will be noted that the edge gage 39 does not appear in this figure. This is because the gage, as shown in Figs. 2, 3 and 4, decreases in height at its forward end until, at or about the cutting point, it does not project at all above the upper portion of the support 37. Referring to Figs. 3 and 5, the effective portion of the gage is approximately that portion which is forward of the point marked X. The common edge of the welt and slip-sole contacts with the gage and thus determines the course of the trimming cut in accordance with the contour of that edge, the outsole projecting over the gage as the sole is advanced to the cutter. It will be noted that the edge of the support 37 is curved and that the gage 39 has a similar curve. This is to facilitate the guiding of the work when curved edges are being trimmed and the shoe is consequently being swung more or less.

Although it has been stated above that the shoe is preferably presented to the machine bottom side up, it is in some cases the practice to present the shoe right side up. For example, in the manufacture of women's shoes it is customary in some factories to incorporate in such shoes a crepe rubber outsole which is so thin and consequently so flexible that it cannot be trimmed satisfactorily with the shoe presented to the machine bottom side up. In such cases it has been found preferable to hold the shoe right side up. The flexibility of the sole permits it to bend upwardly and thus to be held against the edge gage 39; and, owing to the fact that the forward end of the gage tapers downwardly at the locality in which the cutting takes place, this upturned edge will bend down somewhat at this locality and permit the cut to be made properly.

In Figure 5 there is shown a member 71 made of resilient wire and fastened to the work support by having its inner end bent upwardly and driven into a suitable socket in the support. As the operator swings the shoe during the trimming operation, there is danger at times that he may move one hand into a position where it would contact with the forward portion of the cutter 9. Before, however, this can take place, his hand will contact with the member 71 which thus serves as a sort of telltale to warn the operator of danger.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:—

1. A machine for trimming the edge of a rubber sole to cause its contour to correspond to that of the previously trimmed welt or middle sole having, in combination, a dished cutter having a continuous cutting edge, means for rotating the cutter, a stationary support for the margin of the sole, and means for mounting the support for adjustment with respect to the cutter.

2. A machine for trimming the edge of a rubber sole to cause its contour to correspond to that of the previously trimmed welt or middle sole having, in combination, a dished cutter having a continuous cutting edge, means for rotating the cutter, means for supplying lubricant to the cutter, a substantially flat stationary support for the margin of the sole, and means for mounting the support for adjustment toward and from the cutter.

3. A machine for trimming the edge of the sole of a shoe having, in combination, a dished cutter, a support for the projecting margin of the sole, the relative positions of the cutter and support being such that the convex face of the cutter is presented toward the shoe during the trimming operation, a gage for the welt of the shoe located adjacent to the concave face of the cutter, and means for rotating the cutter.

4. A machine for trimming the edge of the sole of a shoe having, in combination, a dished cutter, a support for the projecting margin of the sole, the relative positions of the cutter and support being such that the convex face of the cutter is presented toward the shoe during the trimming operation, a gage for the welt of the shoe carried by the support and located adjacent to the concave face of the cutter, and means for rotating the cutter.

5. A machine for trimming the edge of the projecting margin of the sole of a shoe having, in combination, a dished cutter, a member for supporting the margin of the sole against the thrust of the cutter, an edge gage located opposite the concave face of the cutter, and means for rotating the cutter.

6. A machine for trimming the edge of the projecting margin of the sole of a shoe having, in combination, a support adapted to extend beneath the welt of the shoe, a gage for the edge of the welt, a dished cutter having its concave face presented toward the edge gage, and means for rotating the cutter.

7. A machine for trimming the edge of the projecting margin of the sole of a shoe to the edge of the welt of which has previously been imparted a desired contour having, in combination, a dished cutter, a support adapted to engage the side of the welt opposite to that on which the sole is located, a gage for engaging the edge of the welt but not the edge of the sole, and means for rotating the cutter.

8. A machine for trimming the edge of the projecting margin of the sole of a shoe to the edge of the welt of which has previously been imparted a desired contour having, in combination, a cutter, a support adapted to engage the side of the welt opposite to that on which the sole is located, a gage for engaging the edge of the welt but not the edge of the sole, and means for driving the cutter.

9. A machine for trimming one of a plurality of layers of material which form the marginal extension of a shoe, another layer of which has the desired contour, having, in combination, a support for the marginal extension, a cutter, and a gage arranged to engage the edge of the layer having the desired contour and constructed and arranged to permit the layer which is to be trimmed to project over said gage so as to determine the course of trimming of the last-named layer in accordance with that of the layer having the desired contour.

10. A machine for trimming one of a plurality of layers of material which form the marginal extension of a shoe, another layer of which has the desired contour, having, in combination, a support for the marginal extension, a dished cutter, and a gage arranged to engage the edge of the layer having the desired contour and constructed and arranged to permit the layer which is to be trimmed to project over said gage so as to determine the course of trimming of the last-named layer in accordance with that of the layer having the desired contour.

11. A machine for trimming one of a plurality of layers of material which form the marginal extension of a shoe, another layer of which has the desired contour, having, in combination, a support for the marginal extension, a dished cutter, and a gage carried by the support arranged to engage the edge of the layer having the desired contour and constructed and arranged to permit the layer which is to be trimmed to project over said gage so as to determine the course of trimming of the last-named layer in accordance with that of the layer having the desired contour.

12. A machine for trimming one of a plurality of layers of material which form the marginal extension of a shoe, another layer of which has the desired contour, having, in combination, a support for the marginal extension, a cutter, and a gage carried by the support adapted to engage the edge of the layer having the desired contour and constructed and arranged to permit the layer which is to be trimmed to project beyond said gage so as to determine the course of the trimming cut in accordance with the desired contour.

13. A machine of the character described comprising means arranged to engage and support the face of the marginal extension of a shoe bottom having an untrimmed outsole projecting beyond the perimeter of said extension, a stationary edge-gage arranged to engage said perimeter to guide the shoe thereby, and a cutter arranged to trim the margin of the outsole flush with said perimeter.

14. A machine of the class described having, in combination, a support for the marginal extension of a shoe, a cutter adapted to trim the margin of a sole fed over said support, and an edge gage located above the support and terminating approximately at the locality in which the edge of the cutter approaches most closely to the support.

15. A machine of the class described having, in combination, a support for the marginal extension of a shoe, a cutter having a thin, circular edge adapted to trim the margin of a sole fed over said support, and an edge gage located above the support and terminating approximately at the locality in which the edge of the cutter approaches most closely to the support.

16. A machine of the class described having, in combination, a support for the marginal extension of a shoe, a dished cutter adapted to trim the margin of a sole fed over said support, and an edge gage located above the support and terminating approximately at the locality in which the edge of the cutter approaches most closely to the support.

17. A machine of the class described having, in combination, a work support, an edge gage rising from the support, and a dished cutter having its concave face presented toward the edge gage.

18. A machine of the class described having, in combination, a work support having a curved edge, an edge gage spaced from the edge of the work support and curved to correspond to the curve of the work support, and a dished cutter having its concave face presented toward the edge gage.

19. A machine of the class described having, in combination, a cutter, a work-rest comprising a support having a curved edge, and a gage having its operative face spaced from the edge of the support and curved to correspond to the curvature of the support, and means for driving the cutter.

20. A machine of the class described having, in combination, a dished cutter, a work-rest comprising a support having a curved edge, and a gage having its operative face spaced from the edge of the support and curved to correspond to the curvature of the support, and means for driving the cutter.

21. A machine of the class described having, in combination, a cutter, a work-rest comprising a support having a curved edge, and a gage having its operative face spaced from the edge of the support and curved to correspond to the curvature of the support, means whereby the work-rest may be adjusted bodily in two directions and angularly in two directions, and means for driving the cutter.

22. A machine of the class described having, in combination, a dished cutter, a work-rest having a portion adapted to support the work and a portion adapted to guide the work, a head by which the cutter and work-rest are carried; a pedestal by which the head is carried, and an adjustable connection between the head and pedestal for permitting angular adjustment of the head.

23. A machine for trimming one of a plurality of layers of material which form the marginal extension of a shoe, another layer of which has been previously trimmed, having, in combination, a support for the marginal extension, a cutter, and a gage carried by the support and adapted to engage the edge of the trimmed layer, whereby said trimmed layer serves as a templet to determine the course of trimming of the untrimmed layer.

24. A machine for trimming the sole of a shoe the welt of which has been previously trimmed, having, in combination, a cutter, a support adapted to enter the welt crease, and a gage adapted to engage the edge of the welt whereby the welt serves as a templet to determine the course of trimming of the sole.

In testimony whereof I have signed my name to this specification.

MICHAEL FRANK BROGAN.